United States Patent [19]

Fukuda

[11] Patent Number: 5,211,255

[45] Date of Patent: May 18, 1993

[54] MOTORCYCLE

[75] Inventor: Takayoshi Fukuda, Iwata, Japan

[73] Assignee: Yamaha Hatsudoki Kabushiki Kaisha, Iwata, Japan

[21] Appl. No.: 633,050

[22] Filed: Dec. 21, 1990

[30] Foreign Application Priority Data

Dec. 22, 1989 [JP] Japan .................................. 1-333380

[51] Int. Cl.⁵ .............................................. B62K 11/02
[52] U.S. Cl. .................... 180/219; 180/68.1; 180/68.4; 180/229; 180/311
[58] Field of Search ............... 180/219, 229, 68.1, 180/68.4, 311; 280/288.3, 288.2

[56] References Cited

U.S. PATENT DOCUMENTS

| | | | |
|---|---|---|---|
| 4,478,306 | 10/1984 | Tagami | 180/229 |
| 4,830,135 | 5/1989 | Yamashita | 180/229 |
| 4,982,973 | 1/1991 | Saito et al. | 180/229 |

FOREIGN PATENT DOCUMENTS

| | | | |
|---|---|---|---|
| 388820 | 9/1990 | European Pat. Off. | 180/219 |
| 2624084 | 6/1989 | France | 180/209 |
| 204877 | 8/1989 | Japan | 180/219 |
| 244993 | 9/1989 | Japan | 180/219 |
| 306383 | 12/1989 | Japan | 180/219 |

*Primary Examiner*—Mitchell J. Hill
*Attorney, Agent, or Firm*—Ernest A. Beutler

[57] ABSTRACT

A number of embodiments of motorcycle constructions having frame made up of box shaped cross section main frame members that extend downwardly and rearwardly at an acute angle to the head pipe. The radiator covers, seat and frame are configured and constructed in such a way as to provide a smooth continuous surface for gripping between the legs of a rider. In some embodiments, this continuous surface is provided by the frame, radiator covers and seat directly and in other embodiments covers are provided over the main frame members to provide the continuous surface either by separate elements or by extension of the radiator covers.

6 Claims, 7 Drawing Sheets

MOTORCYCLE

BACKGROUND OF THE INVENTION

This invention relates to a motorcycle and more particularly to a frame and body construction therefore that permits the rider to assume a wide variety of attitudes on the motorcycle and be comfortable in all such positions.

As is well know, motorcycles are constructed primarily for the type of road and riding conditions which they are expects to encounter. One type of motorcycle is designed primarily for riding in off-the-road or rough terrain conditions or in competition such as Moto crossing. This type of motorcycle must have a very robust frame and also must provide a seat arrangement that permits the rider to assume a wide variety of riding postures depending upon the riding conditions.

Generally the frame for such types of motorcycles includes a head pipe and a tubular main frame that extends rearwardly therefrom and which mounts the fuel tank. Frequently, this type of motorcycle is provided with a full or partially water cooled engine and the radiator is positioned at the front of the frame. A pair of radiator covers are disposed on the opposite sides of the radiator so as to direct the air flow across the core of the radiator.

Generally it is the practice to provide a relatively long seat that accommodates various riding positions for the rider. In addition, the rider likes to have the frame and body in such a manner that the rider may place his legs in close contact with it, much akin to a rider on a horse for stability. Under other conditions, the rider likes to place one or both of his feet forwardly for bracing purposes. The type of motorcycle described and frame construction therefore permits such riding postures by the rider.

However, due to the extremely rough use that such motorcycles encounter, it is desireable to provide a stronger and more robust frame. Therefore, it has been proposed to provide a frame assembly having a head pipe and a pair of main frame members which are formed as rectangular box sections and which extend rearwardly from the head tube backwardly toward the rear wheel. These main frame members generally diverge from a longitudinal center plane of the motorcycle in an angular fashion and thus provide a somewhat irregular configuration in the area of the legs of the rider. This problem is compounded when a radiator and radiator covers are provided for directing the flow of air across the radiator. With motorcycles of this type previously proposed, the rider has been somewhat limited in ability to move freely from one riding position to another.

It is, therefore, a principal object of this invention to provide an improved motorcycle arrangement having a robust frame that lends itself to off-the-road use and wherein the sides of the motorcycle are relatively smoothly configured so that the rider can conveniently move riding positions.

It is a further object to this invention to provide an improved and relatively smooth frame and body construction for a motorcycle that permits a rider to move to various riding positions freely and without incumbrance.

In connection with the frame assembly of the type described embodying box type main frame members, it has been the practice to have the main frame members extend generally perpendicularly back from the head pipe and then bend downwardly to support the rear wheel suspension system. Of course, such bends in the frame construction can give rise to stress risers which can only be compensated for by employing heavy frame members.

It is, therefore, a still further object to this invention to provide a frame construction having box like main frame members which can extend straight back from the head pipe without having stress inducing bends.

SUMMARY OF THE INVENTION

This invention is adapted to be embodied in a motorcycle for rough terrain use which comprises a frame assembly comprised of a head pipe dirigibly supporting a front wheel. A pair of main frame members having generally box shaped cross section are affixed at their forward ends to the head pipe and extend downwardly and rearwardly therefrom. The main frame members diverge from a longitudinal center plane passing rearwardly of the head pipe. A radiator is carried by the frame assembly contiguous to and below the main frame members adjacent the head pipe. A seat is carried by frame assembly rearwardly of the head pipe. A pair of radiator covers are affixed relative to the frame assembly on opposite sides of the radiator. Means provide a substantially continuous surface area between the radiator covers, the main frame members and the seat for providing a gripping area for the legs of a rider.

DETAILED DESCRIPTION OF THE PREFERRED EMBODIMENTS

Figure 1:
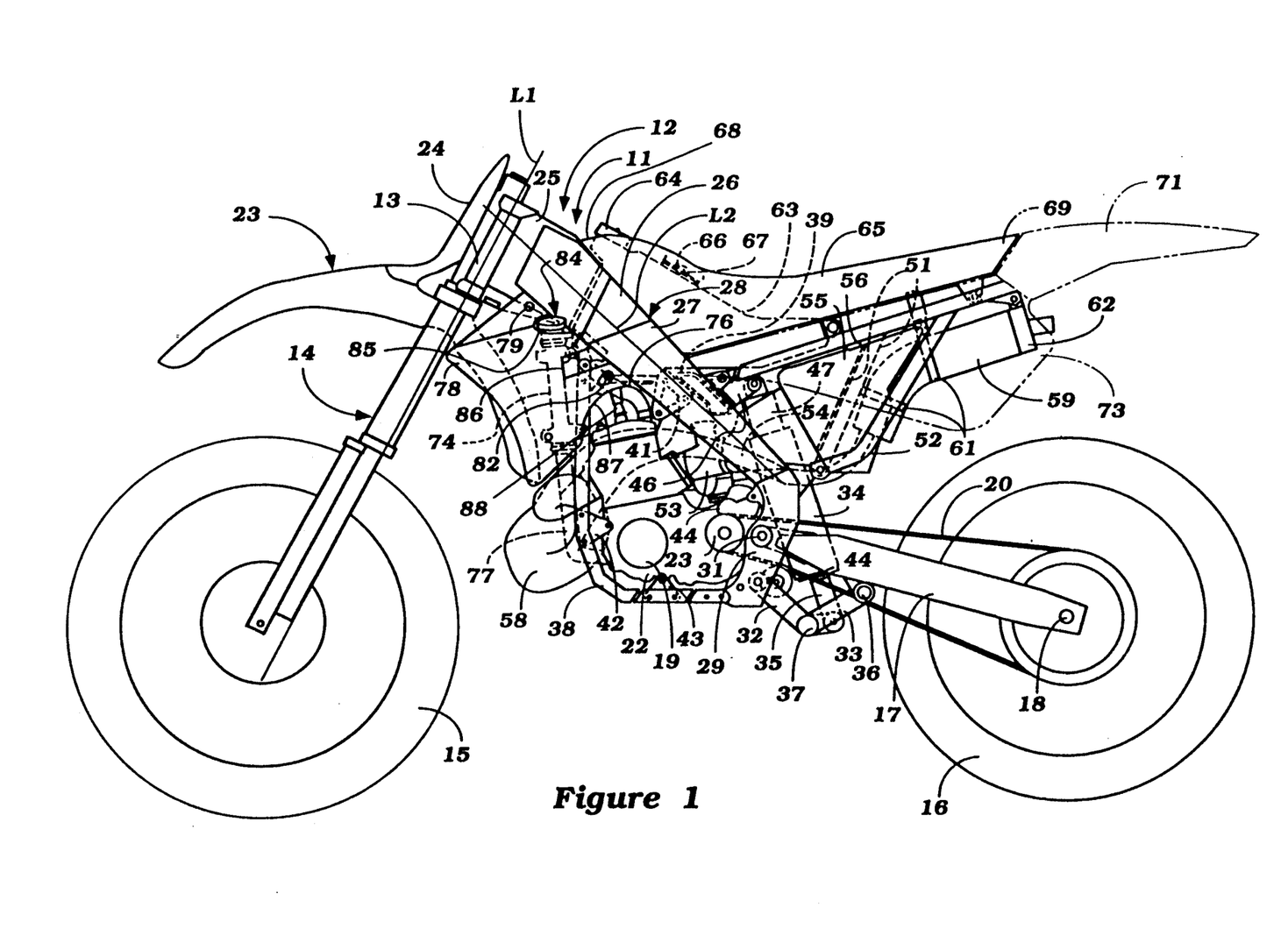
FIG. 1 is a side elevational view of a motorcycle constructed in accordance with an embodiment of the invention.
Figure 2:
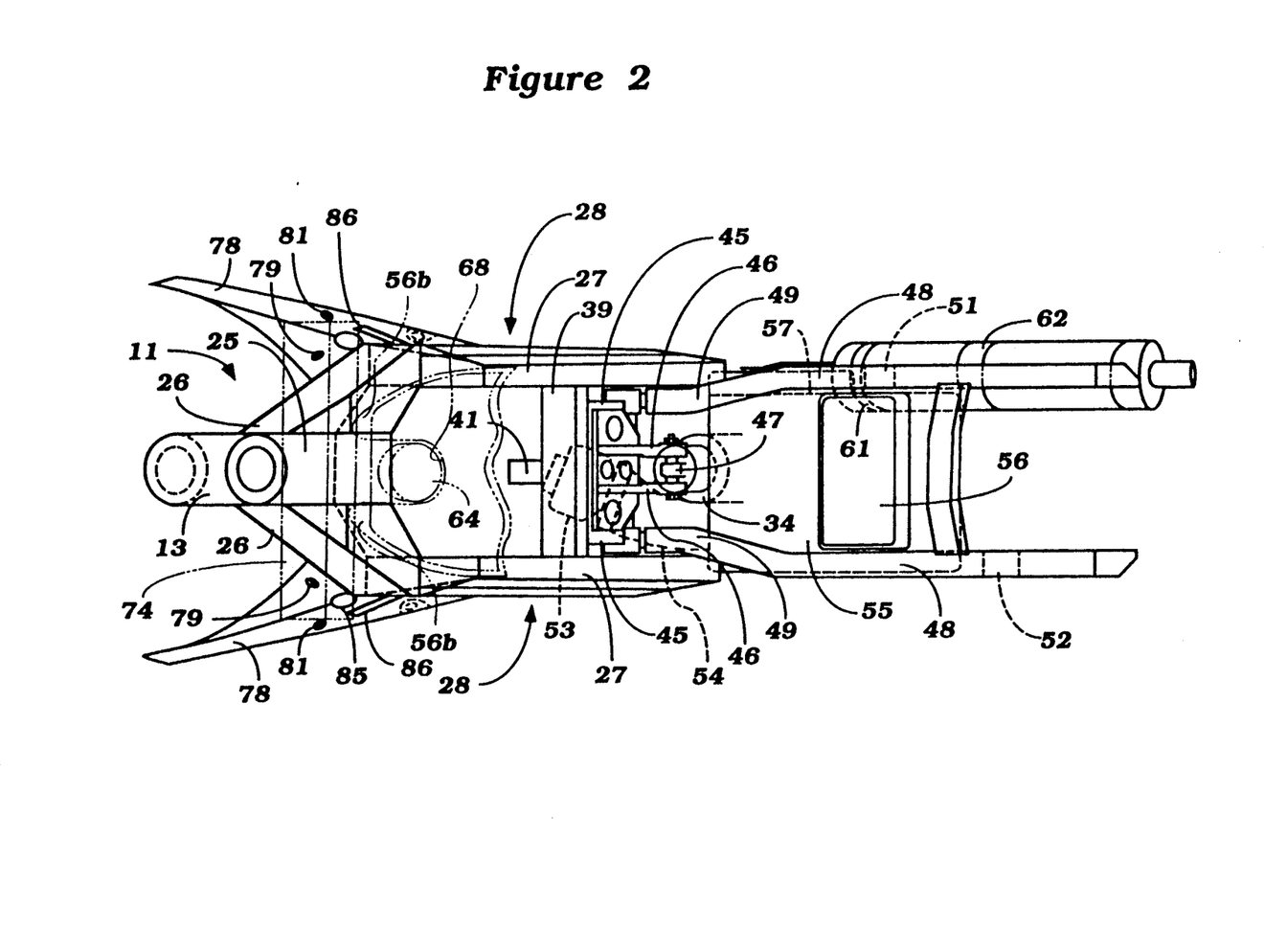
FIG. 2 is a top plan view of a portion of the motorcycle, with other portions removed to more clearly show the construction of the frame and body of the motorcycle.
Figure 3:
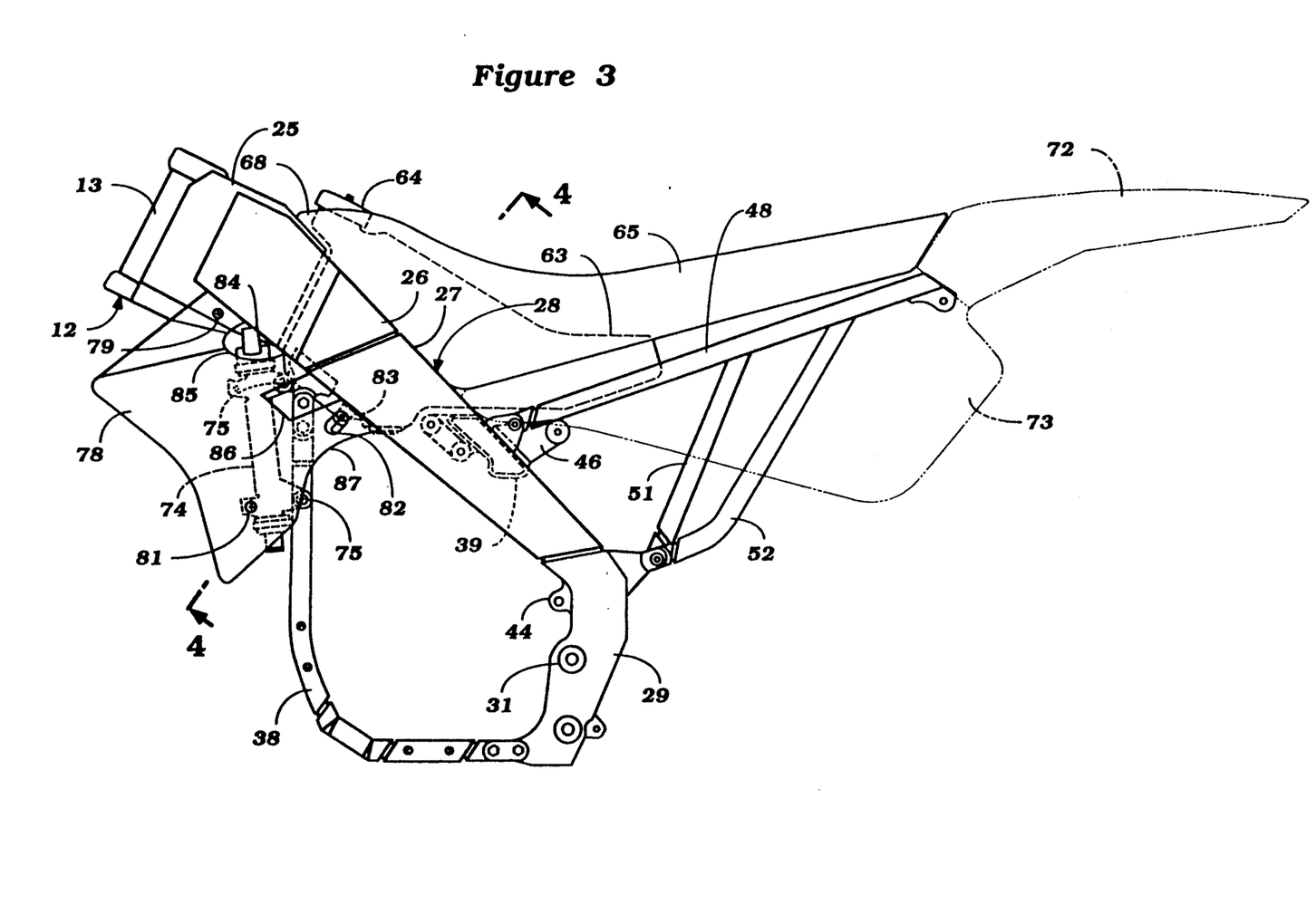
FIG. 3 is an enlarged side elevational view showing the frame assembly and certain components associated with it.

Referring now in detail to the drawings and initially to the embodiment of FIGS. 1–4, a motorcycle constructed in accordance with this embodiment is identified generally by the reference numeral The motorcycle is comprised of a fabricated frame assembly, indicated generally be the reference numeral 12 and which is shown in most detail in FIG. 3. This frame assembly 12 includes a head pipe 13 which, in turn, journals a front fork assembly 14 for dirigible movement about a steering axis that is inclined to the vertical and which is identified in FIG. 1 by the line L1. A front wheel 15 is journaled at the lower end of the front fork assembly 14 in a suitable manner and some form of suspension mechanism may be provided between the front fork 14 and the wheel 15.

A rear wheel 16 is journaled by a trailing arm assembly 17 which is pivotally supported by the frame assembly 12 in a manner to be described. The wheel 16 is rotatable about an axis 18 and is driven by a chain 20 from a power plant consisting of an engine 19 mounted in the frame assembly 12 in a manner to be described. The engine 19, as is typical, has an combined crankcase change speed transmission assembly 21 which drives an output shaft 23 for driving, in turn, the chain 20 and rear wheel 16.

A front fender 23 is carried by the front fork assembly 14 and overlies the front wheel 15. A number or competition plate 24 may be carried at the upper end of the fender 23 so as to carry a competition number.

The frame assembly 12, in addition to the head pipe 13, includes a welded up box assembly 25 that extends rearwardly therefrom and in a generally downward direction. This box assembly 25 is encompassed on its sides by means of a pair of connecting frame members 26 which have a generally box shape cross sectional configuration.

These connecting frame members 26 are connected to further generally box shaped cross section frame members 27 and form a pair of main frame members, indicated generally by the reference numeral 28, which generally diverge in a rearward direction from a longitudinal center plane containing the axis of the head pipe 13. Also as may be seen in FIG. 1 and 3, these main frame members 28 extend generally in a downward direction along a line L2 which is at an acute angle to the head pipe axis L1 and do not require the formation of bends therein, as is typical with prior art type of frame constructions. As a result, no stress risers are encountered and the frame construction can be lighter and stronger than the prior art type of constructions including such bent main frame members. The connection of the interconnecting frame members 26 to the box like frame assembly 25 is generally at a right angle, however, so as to provide a relatively high strength assembly.

At their rear ends, the main frame members 28 are each connected to a respective one of a pair of brackets 29 which brackets provide a journal 31 for the pivotal movement of the trailing arm 17.

A linkage assembly comprised of a first link 32 and a second link 33 which are pivoted to the rear arm bracket 29 and trailing art 17, respectively, loads a shock absorber and suspension element 34 through its piston rod 35. This provides for suspension movement and damping of the rear wheel 16. A pivotal connection 36 is provided between the link 33 and the trailing arm 17 and a further pivotal connection 37 is provided between the links 32 and 33.

A downtube or subframe member 38 is connected between the rear arm bracket 29 and a forward and upper portion of each of the main frame members 28 for strengthening purposes.

A cross member 39 is welded or otherwise affixed between the middle portions of the main frame members 28 and provides reinforcing. A first engine mount 41 is carried by this cross member 39 and is attached to the engine unit 19 for its suspension. In addition, mounting brackets 42 are affixed to the subframes 38 on the vertical portion thereof and mounting brackets 43 are affixed on the horizontally extending portions thereof for supporting the engine unit 19. The rear arm brackets 29 also carry mounting brackets 44 for carrying the engine unit 19.

Affixed to the cross member 39 is also a rear suspension support bracket 45 that carries or forms a bracket portion 46 to which the upper end of the suspension element 34 is connected by a mounting bracket 47.

A pair of seat rails 48 are connected at their forward ends by offset portions 49 to the opposite sides of the main frame members 28 adjacent the brackets 45. Since this connection is adjacent the cross member 39 a robust construction is provided and it is possible to make the seat rails 48 narrower at the front of the motorcycle so as to improve the riding position A pair of back stays 51 and 52 are connected between the rear arm brackets 29 and the seat rails 48 for providing support for them.

The engine 19 is provided with an induction system that includes a carburetor 53 that is disposed on the rear side of the engine and generally in the area between the rear ends of the main frame members 28. An inlet pipe 54 connects the carburetor 53 with an air cleaner 55 that is positioned between the seat back stays 51 and 52 and which has a generally upwardly facing opening 56 into which atmospheric air can be drawn. This opening 56 is concealed and protected, as well become apparent as this description proceeds, by a seat carried by the frame assembly. The rear end of the air cleaner 56 is provided with a generally concave surface 57 (FIG. 1) so as to clear a portion of the exhaust system, now to be described.

The engine 19 has a generally forwardly facing exhaust port from which an exhaust pipe 58 extends. The exhaust pipe 58 extends generally forwardly and downwardly and then curves around the right side of the motorcycle and extends to a muffler 59 that is mounted at the rear right hand side of the frame and specifically one of the seat rails 48 by means of a pair of straps 61 and 62. The curved section 57 of the air cleaner 55 clears the exhaust pipe and the muffler.

A fuel tank 63 is mounted on the frame assembly 12 between the main frame members 28 and generally rearwardly of the frame assembly 25. The fuel tank 63 has a forwardly positioned filler neck on which a cap 64 is detachably connected.

A seat 65 is mounted on the frame assembly and specifically by a bracket or connecting assembly 66 to a bracket 67 affixed to the fuel tank 63. The forward portion of the seat 65 is provided with a cut-out 68 so as to clear the filler neck and filler cap 64 so that the fuel tank can be replenished without removing the seat 65.

The seat 65 has a long portion that extends back from the head pipe 13 to a rear part 69 that is positioned adjacent a rear fender 71 that overlies the rear wheel 16 so as to permit the rider to move to any desired position on the seat 65 for balance purposes.

Side covers 73 may be affixed to the seat rails 48 below the seat 65 so as to provide an area for contact with the rider's legs and also so as to provide a smooth configuration.

The engine 19 is fully or at least partially water cooled and to this end there is provided a cooling radiator 74 that is mounted to the subframe 38 by means of mounting bolts 75. The radiator 74 is connected to the cooling system of the engine by conduits 76 and 77 so that coolant may flow through the engine cooling jacket and radiator 74. The engine 19 is provided with a suitable cooling pump (not shown) for accomplishing this circulation.

In order to direct a cooling air flow across the radiator 74, there are provided a pair of side covers 78 which, as may be seen in FIG. 2, diverge forwardly of the motorcycle so as to provide a scoop like effect to direct cooling air back to the radiator 74. The side covers 78 are affixed to the frame assembly by means of fasteners 79 that extend into the frame assembly 25, fasteners 81 that extend into the radiator 74 and fasteners 82 which are fastened into bosses 83 carried at the lower ends of the main frame members 27.

Figure 4:
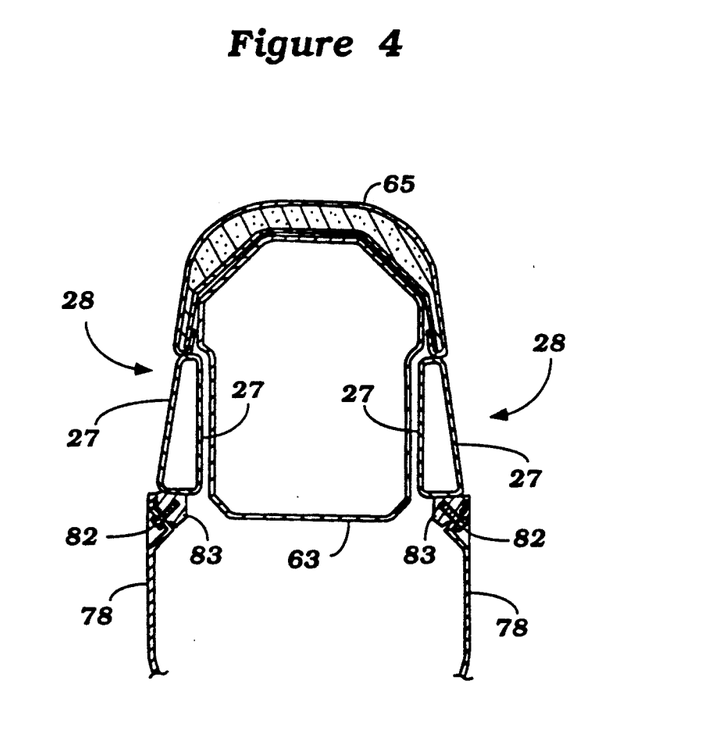
FIG. 4 is a cross sectional view taken along the line 4—4 of FIG. 3.

As may be readably seen in FIG. 4, the side surfaces of the radiator side covers 78, the frame members 27 and the seat 65 provide a very smooth surface so that the rider's legs may be positioned at any desired location along the assembly of the motorcycle and grip the motorcycle therebetween much like a rider on a horse may grip the horse between the legs. This permits the rider to assume any desired attitude on the seat 65 without any interference.

The radiator 74 is provided with a fill neck on which a cap 84 is positioned. The one of the side covers 78 is provided with a relief 85 so that the cap 84 may be readily accessable and so that coolant may be added to the cooling system without removing the side cover 78. The side covers 78 are also provided with cut-outs 86 so as to permit cooling air to flow freely across the radiator 74 and exit forwardly and above the engine 19. Of course, some air will also flow rearwardly and exit in that area.

The side covers 78 are also provided with reliefs 87 which are juxtaposed to the spark plug or spark plugs 88 (FIG. 1) of the engine so that the spark plugs 88 may be removed or serviced without necessitating removal of the side cover.

It should be readily apparent, therefore, that the described construction provides a very streamlined and smooth body, seat and frame construction for the motorcycle and in which the rider may move to any desired seating position and still have a tight engagement between the legs and the body and frame of the motorcycle.

Figure 5:
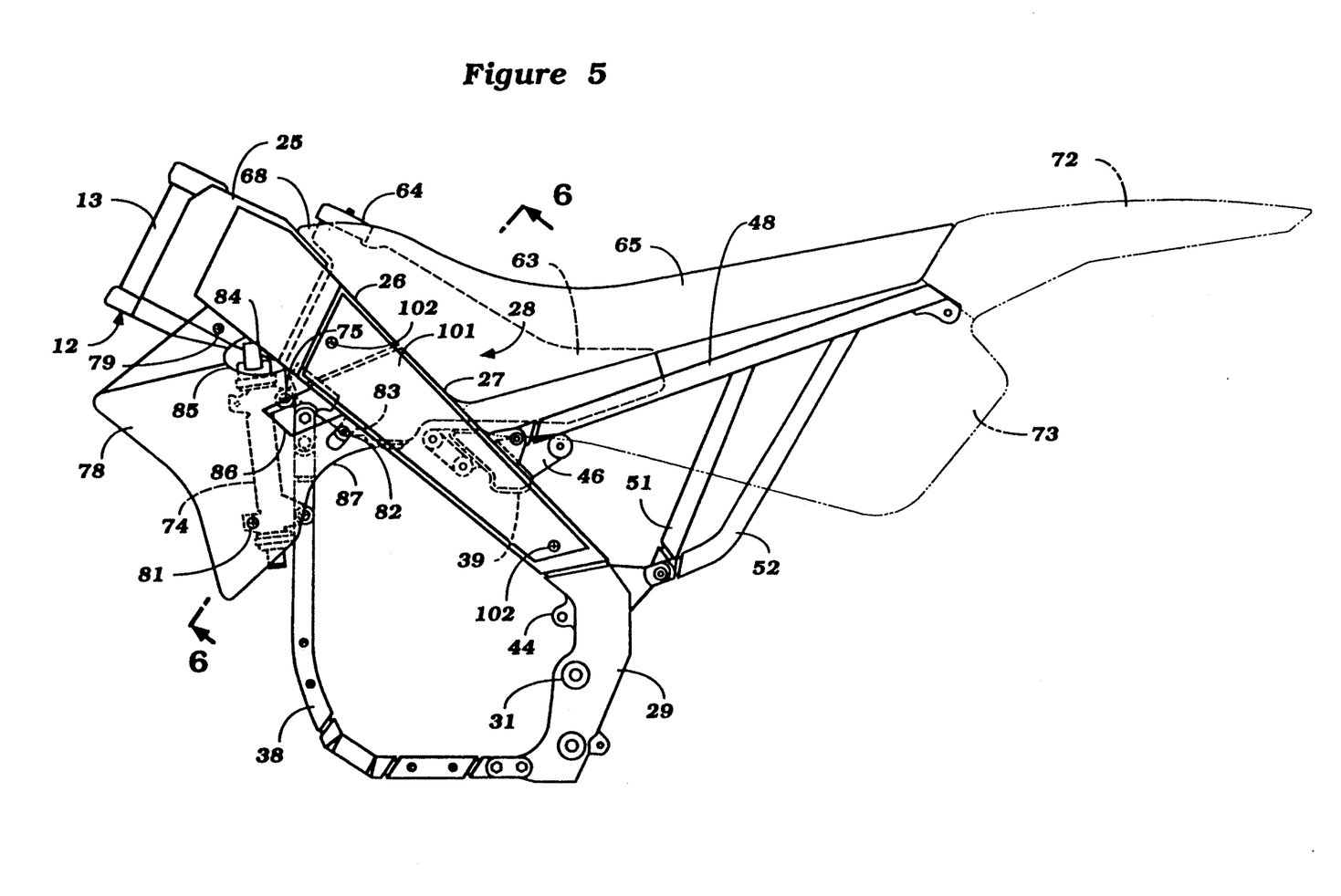
FIG. 5 is a side elevational view, in part similar to FIG. 3, and shown another embodiment of the invention.
Figure 6:
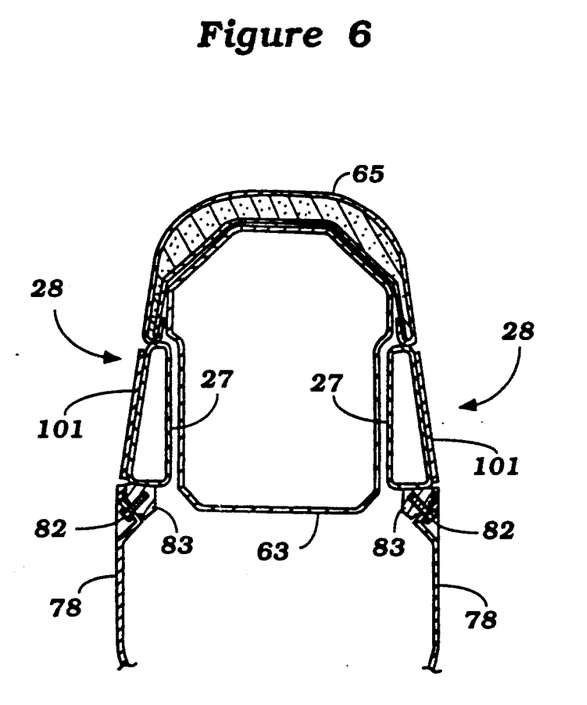
FIG. 6 is a cross sectional view taken along the line 6—6 of FIG. 5.

In the embodiment of the invention as thus far described, the smooth side surface of the body of the motorcycle has been accomplished by having the main frame members 28 extend coextensively with the radiator side covers 78 and the seat 65. FIGS. 5 and 6 show another embodiment of the invention wherein the same result is achieved in a slightly different manner. This embodiment is the same, for the most part, as the previously described embodiment and, for that reason, components which are the same have been identified by the same reference numeral and will not be described again. In this embodiment, however, the main frame members 28 are spaced slightly inwardly from the radiator covers 78 and the outer periphery of the seat 59 as best seen in FIG. 6. However, a pair of wear strips 101 are affixed along the outer side of the main frame members 28 by means of fasteners 102 so as to provide the continuous surface and the advantages of the previously described embodiment. However, with this embodiment, the wear strips 101 will protect the main frame members 28 from damage. If the wear strips 101 become damaged, they can be easily removed and replaced. In all other regards, this embodiment is the same as that previously described and, for that reason, further description of this embodiment is not believed to be necessary.

Figure 7:
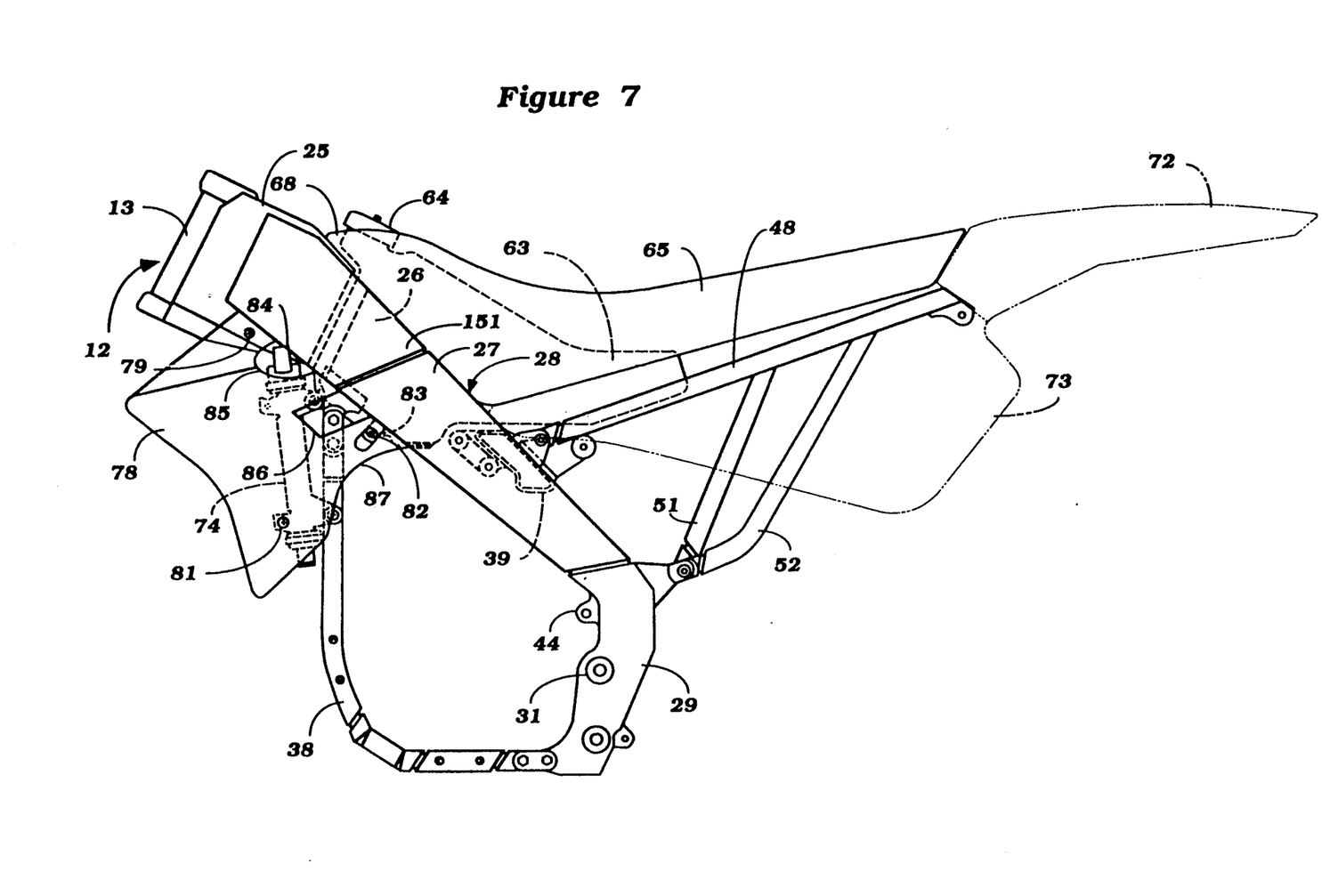
FIG. 7 is a side elevational view, in part similar to FIGS. 3 and 5, and shows another embodiment of the invention.

FIG. 7 shows yet another embodiment of the invention which is generally similar to the previously described embodiments. In this embodiment, however, the radiator side covers 78 have extending portions 151 that overlie the connecting frames 26 and which provide the continuous surface with the seat 65 and the radiator side covers 78. Aside from this difference, this embodiment is the same as those previously described and, for that reason, further description of this embodiment is not believed to be necessary to understand and practice the invention.

It should be readily apparent from the foregoing description that the embodiments of the invention provide a very strong frame assembly for an off-the-road motorcycle and one in which the side configuration of the frame and body and seat are such that a rider may adopt any position on the motorcycle and grasp the frame and body between the rider's legs to offer a good stability without any inconvenience by projecting portions of the frame or body. Of course, the foregoing description is that of preferred embodiments of the invention and various changes and modifications may be made without departing from the spirit and scope of the invention, as defined by the appended claims

I claim:

1. A motorcycle for rough terrain use comprising a frame assembly comprised of a head pipe dirigibly supporting a front wheel, a pair of main frame members having a generally box shaped cross section affixed at their front ends to said head pipe and extending downwardly and rearwardly therefrom, said main frame members diverging from a longitudinal center plane rearwardly of said head pipe, a radiator carried by said frame assembly continuous to and below said main frame members adjacent said head pipe, a seat carried by said frame assembly rearwardly of said head pipe and having a top surface and a pair of side surfaces each terminating adjacent to portions of said main frame members and in non-overlapping relation thereto, a pair of radiator covers affixed relative to said frame assembly each on a respective side of said radiator and terminating adjacent to portion of said main frame members in non-overlapping relation thereto, the side surface of said seat, said main frame members and said radiator covers each being exposed to view from the side, and means for providing a substantially contiguous surface area between said radiator covers, said main frame members and said seat sides for gripping of the motorcycle by the legs of a rider seated upon the seat on any of a variety of positions.

2. A motorcycle as set forth in claim 1 wherein each radiator cover and the seat sides have adjacent outer surfaces lying on substantially a common contiguous surface and the main frame members have positions that are spaced inwardly from that common contiguous surface and covered on each side of the motorcycle by a frame cover member that covers only said main frame members and provides the contiguous surface area with the radiator covers and the seat sides on the respective side.

3. A motorcycle as set forth in claim 2 wherein the frame cover members are detachably affixed to the frame.

4. A motorcycle as set forth in claim 1 wherein the main frame members extend continuously in a substantially straight line at an acute angle to the head pipe downwardly and rearwardly for connection to a member for providing support for the rear wheel of the motorcycle.

5. A motorcycle as set forth in claim 4 wherein each radiator cover and the seat sides have adjacent outer surfaces lying on substantially a common contiguous surface and the main frame members have portions that are spaced inwardly from that common contiguous surface and covered on each side of the motorcycle by a frame cover member that provides than contiguous surface are with the radiator cover and seat seats on the respective side.

6. A motorcycle as set forth in claim 5 wherein the frame cover members are detachably affixed to the frame.

* * * * *

UNITED STATES PATENT AND TRADEMARK OFFICE
CERTIFICATE OF CORRECTION

PATENT NO. : 5,211,255
DATED : May 18, 1993
INVENTOR(S) : Takayoshi Fukuda

It is certified that error appears in the above-indentified patent and that said Letters Patent is hereby corrected as shown below:

Column 6, line 47, Claim 1 "on" should be --in--.

Column 7, line 6, Claim 5, "than" should be --the--.

Column 8, line 1, Claim 5, "are" should be --area--.

Column 8, line 1, Claim 5, "seats" should be --sides--.

Signed and Sealed this

Fifth Day of April, 1994

*Attest:*

BRUCE LEHMAN

*Attesting Officer*  *Commissioner of Patents and Trademarks*